United States Patent
Nishimura

[11] Patent Number: 6,003,009
[45] Date of Patent: *Dec. 14, 1999

[54] TRANSFER INFORMATION MANAGEMENT DEVICE AND TRANSFER INFORMATION MANAGEMENT METHOD

[75] Inventor: Takeshi Nishimura, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/714,602

[22] Filed: Sep. 16, 1996

[30] Foreign Application Priority Data

Sep. 11, 1995 [JP] Japan ................................ 7-291105

[51] Int. Cl.$^6$ ........................................ G06F 17/60
[52] U.S. Cl. .................................... 705/5; 705/6
[58] Field of Search ............... 705/5, 6, 41, 411; 707/202.2; 345/341, 501

[56] References Cited

U.S. PATENT DOCUMENTS

| | | | |
|---|---|---|---|
| 4,975,696 | 12/1990 | Salter, Jr. et al. | 340/973 |
| 5,191,523 | 3/1993 | Whitesage | 364/407 |
| 5,208,590 | 5/1993 | Pitts | 340/973 |
| 5,237,499 | 8/1993 | Garback | 364/407 |
| 5,311,425 | 5/1994 | Inada | 364/407 |
| 5,478,991 | 12/1995 | Watanabe et al. | 235/375 |
| 5,724,520 | 3/1998 | Goheen | 395/205 |

*Primary Examiner*—Allen R. MacDonald
*Assistant Examiner*—Hani M. Kazimi
*Attorney, Agent, or Firm*—Staas & Halsey

[57] ABSTRACT

A transfer information management device provides helpful transfer information to airport users. The transfer information management device is used in connection with a plurality of management devices which control a corresponding plurality of databases storing airport operation information. The databases manage airport operations by updating and referring to the contents of the databases. The transfer information management device is provided with a display section, a read-out section, a creating section, and a display control section. The read-out section reads out information stored in the plurality of databases. The creating section creates a transfer information database which is a database storing flight arrival information relating to flight arrivals and flight departure information relating to flight departures. The transfer information database matches flight arrival information and flight departure information relating to the same passenger, based on information read out by the read-out section. The display control section displays flight arrival information and flight departure information stored in the transfer information database in a format whereby the combinations of a flight arrival and a flight departure relating to the same passenger can be seen.

14 Claims, 24 Drawing Sheets

FIG. 2

| FLIGHT DATABASE | FLIGHT NUMBER |
| | ORIGIN |
| | DESTINATION |
| | STOPOVER |
| | TIME INFORMATION |
| | STATUS |
| | ASSIGNED GATE |

| BAGGAGE RECONCILIATION INFORMATION DATABASE | FLIGHT NUMBER | |
| | TIME INFORMATION | |
| | SPECIFIC BAGGAGE INFORMATION | PASSENGER NAME |
| | | BAGGAGE ID |
| | | ORIGIN |
| | | DESTINATION |
| | | STOPOVER |
| | | WEIGHT/SHAPE |

| PASSENGER INFORMATION DATABASE | FLIGHT NUMBER | | ~13a,13b |
| --- | --- | --- | --- |
| | AIRPLANE INFORMATION | | |
| | TIME INFORMATION | | |
| | STATUS | | |
| | COUNTER INFORMATION | | |
| | SPECIFIC PASSENGER INFORMATION | PASSENGER NAME | |
| | | PASSENGER ATTRIBUTES | |
| | | ORIGIN | |
| | | DESTINATION | |
| | | STOPOVER | |

FIG. 7

| FLIGHT ARRIVAL INFORMATION DATABASE | FLIGHT NUMBER (FLIGHT ARRIVAL) | |
| --- | --- | --- |
| | ORIGIN | |
| | DESTINATION | |
| | STOPOVER | |
| | TIME INFORMATION | |
| | STATUS | |
| | COUNTER INFORMATION | |
| | GATE INFORMATION | |
| | CAROUSEL INFORMATION | |
| | SPECIFIC PASSENGER/BAGGAGE INFORMATION | PASSENGER NAME |
| | | PASSENGER ATTRIBUTES |
| | | BAGGAGE ID |
| | | WEIGHT/SHAPE |
| | | BAGGAGE STATUS |

FIG. 8

| FLIGHT DEPARTURE INFORMATION DATABASE | FLIGHT NUMBER (FLIGHT ARRIVAL) | |
| --- | --- | --- |
| | ORIGIN | |
| | DESTINATION | |
| | STOPOVER | |
| | TIME INFORMATION | |
| | STATUS | |
| | COUNTER INFORMATION | |
| | GATE INFORMATION | |
| | CAROUSEL INFORMATION | |
| | SPECIFIC PASSENGER/BAGGAGE INFORMATION | PASSENGER NAME |
| | | PASSENGER ATTRIBUTES |
| | | BAGGAGE ID |
| | | WEIGHT/SHAPE |
| | | BAGGAGE STATUS |

FIG. 11

| TRANSFER INFORMATION | | | | | | |
|---|---|---|---|---|---|---|
| FLIGHT ARRIVAL | | | | FLIGHT DEPARTURE | | |
| FLIGHT NUMBER | ORIGIN | ARRIVAL TIME | | FLIGHT NUMBER | DESTI-NATION | DEPARTURE TIME |
| JAL034 | N.Y. | 14:30 | | ABC111 | OSAKA | 17:00 |
| ANA112 | L.A | 15:00 | | BBC123 | SENDAI | 17:00 |
| CCC222 | OSAKA | 15:00 | | AAA222 | OITA | 17:00 |
| NRT111 | NAHA | 15:30 | | BBB333 | L.A. | 17:30 |
| ERG670 | OITA | 17:00 | | SDS321 | N.Y. | 18:30 |

FIG. 12

```
                    TRANSFER INFORMATION
       FLIGHT ARRIVAL              FLIGHT DEPARTURE
  ┌────────┬───────┬─────────┐   ┌────────┬───────┬──────────┐
  │ FLIGHT │ORIGIN │ARRIVAL  │   │ FLIGHT │DESTI- │DEPARTURE │
  │ NUMBER │       │TIME     │   │ NUMBER │NATION │TIME      │
  ├────────┼───────┼─────────┤   ├────────┼───────┼──────────┤
  │ JAL034 │ N.Y.  │ 14:30   │───│ ABC111 │ OSAKA │ 17:00    │
  └────────┴───────┴─────────┘   └────────┴───────┴──────────┘
                Eva      Norton
                James    Deen
                Yoshio   Harada
                ...
```

FIG. 13

```
                    TRANSFER INFORMATION
       FLIGHT ARRIVAL              FLIGHT DEPARTURE
  ┌────────┬───────┬─────────┐   ┌────────┬───────┬──────────┐
  │ FLIGHT │ORIGIN │ARRIVAL  │   │ FLIGHT │DESTI- │DEPARTURE │
  │ NUMBER │       │TIME     │   │ NUMBER │NATION │TIME      │
  ├────────┼───────┼─────────┤   ├────────┼───────┼──────────┤
  │ JAL034 │ N.Y.  │ 14:30   │───│ ABC111 │ OSAKA │ 17:00    │
  └────────┴───────┴─────────┘   └────────┴───────┴──────────┘
                      Yoshio   Harada
              (No.)   (Item)     (Weight)   (Status)
              BG03894 Suitcase   25KG       in JAL034
              BG03895 Golf Bag   15KG       in ABC111
```

FIG. 16

| ALTERNATIVE FLIGHT INFORMATION DATABASE | FLIGHT NUMBER (FLIGHT DEPARTURE) ||
| --- | --- | --- |
| | ALTERNATIVE FLIGHT INFORMATION | FLIGHT NUMBER |
| | | DESTINATION |
| | | TIME INFORMATION |
| | | ⋮ |

FIG. 23

BAGGAGE INFORMATION

```
No          BG03894
Item        Suitecase
Weight      25KG
Status      in JAL034   at   Gate13
Action      to Gate9
Message     (OK)
```

FLIGHT ARRIVAL

| FLIGHT NUMBER | ORIGIN | ARRIVAL TIME |
|---|---|---|
| JAL034 | N.Y. | 14:30 |
| GATE NUMBER | | 13 |
| CAROUSEL NUMBER | | Transit |

FLIGHT DEPARTURE

| FLIGHT NUMBER | DESTI-NATION | ARRIVAL TIME |
|---|---|---|
| ABC111 | OSAKA | 17:00 |
| CHECK-IN COUNTER NUMBER | | Transit |
| GATE NUMBER | | 9 |

FIG. 24

BAGGAGE INFORMATION

No          BG03894
Item        Suitecase
Weight      25KG
Status      in JAL034 at Gate13
Action      to Gate9
Message     (OK)

FLIGHT ARRIVAL

| FLIGHT NUMBER | ORIGIN | ARRIVAL TIME |
|---|---|---|
| JAL034 | N.Y. | 14:30 |
| GATE NUMBER | | 13 |
| CAROUSEL NUMBER | | Transit |

FLIGHT DEPARTURE

| FLIGHT NUMBER | DESTINATION | ARRIVAL TIME |
|---|---|---|
| ABC111 | OSAKA | 17:00 |
| CHECK-IN COUNTER NUMBER | | Transit |
| GATE NUMBER | | 9 |

!!Emergency Message!!
Move BG02393 (Suitecase) to Gate11

TRANSFER INFORMATION MANAGEMENT DEVICE AND TRANSFER INFORMATION MANAGEMENT METHOD

BACKGROUND OF THE INVENTION

1. Field of the Invention

The present invention relates to a transfer information management device and transfer information management method for managing information for transferring airplanes.

2. Description of the Related Art

In airports, a variety of systems are used by managers in order to automate various tasks. For example, systems operated by airport managers include control systems and flight information systems. Control systems and flight information systems are systems for managing the departure and arrival of all airplanes using an airport. In these systems, databases, wherein airplane unit data (flight number, origin, destination, time information, and the like) is stored, are used.

Furthermore, systems operated individually by separate airline companies flying airplanes into an airport include passenger information systems. A passenger information system is a system for managing the passengers in each airplane and has a database which matches data indicating the operational status of airplanes and data relating to passengers (passenger name, passenger attributes, origin, destination, and the like).

Furthermore, baggage handling systems are used as systems for managing baggage conveyance tasks within the airport. Such baggage handling systems are usually operated by companies commissioned to undertake baggage conveyance tasks by the airline companies.

Each of the systems described above are highly automated, but between systems, only a minimum necessary exchange of information is conducted. For example, there is virtually no information exchange between passenger information systems which are systems for managing flight reservations. Therefore, in cases where a flight cannot be operated according to schedule, the task of preparing alternative flights for passengers who have made a reservation for that flight must be conducted manually by the airline company, and problems due to operational mistakes have frequently occurred. Furthermore, with regard to baggage, even in the case of transfer between airplanes of the same airline company, baggage is frequently transported somewhere other than the intended destination, due to human error.

SUMMARY OF THE INVENTION

An object of the present invention is to provide a transfer information management device and method which can provide helpful transfer information to airport users.

The transfer information management device of the present invention is used in connection with a plurality of management devices provided with databases wherein information relating to airport operations are stored, which manage airport operations by means of updating and referring to the contents of these databases. The transfer information management device is provided with a display section, a read-out section, a creating section, and a display control section. The read-out section reads out information stored in the databases belonging respectively to the plurality of information management devices. The creating section creates a transfer information database, which is a database where flight arrival information relating to flight arrivals and flight departure information relating to flight departures are stored, and which contains information matching flight arrival information and flight departure information relating to the same passenger, based on information read out by the read-out section. The display control section displays, on the display section, the flight arrival information and flight departure information stored in the transfer information database, in a format whereby the combinations of a flight arrival and a flight departure relating to the same passenger can be seen.

In other words, the transfer information management device of the present invention reads out various information from databases provided in existing management devices, and displays the read out information in a format that is helpful for making a transfer.

In the transfer information management device of the present invention, in addition to using a creating section for creating a transfer information database which contains passenger names, it is also desirable to append a first selecting section, a second display control section, a second selecting section and a third display control section. The first selecting section selects one combination of flight arrival information and flight departure information from the flight arrival information and flight departure information displayed by the display control section. The second display control section displays, on the display section, the passenger names in the transfer information database corresponding to the combination of flight arrival information and flight departure information selected by the first selecting section. The second selecting section selects one passenger name from the passenger names displayed on the display section by the second display control section. The third display control section displays baggage information from the transfer information database corresponding to the passenger name selected by the second selecting section.

By means of a transfer information management device constituted in this way, passengers are able readily to confirm the status of their own baggage.

Furthermore, the transfer information management device may also be provided additionally with a flight departure information selecting section, which selects one flight departure information item from the flight arrival information and flight departure information displayed by the display control means, and an alternative flight information display control section, which displays further flight departure information from the transfer information database having the same destination as the flight departure information selected by the flight departure information selecting section.

By means of a transfer information management device constituted in this way, passengers are able readily to confirm the airplanes which they can use as alternative flights, in the event of cancellation of the scheduled flight departure, or the like.

Furthermore, in cases where an alternative flight information display control section or the like is additionally provided, it is also desirable to append an alternative flight information selecting section for selecting one alternative flight information item from the alternative flight information displayed by the alternative flight information display control section, and an inquiry section for inquiring, with respect to the management device managing flight departures corresponding to the alternative flight information selected by the alternative flight information selecting section, whether a flight reservation is possible, and displaying the results of this inquiry on the display section.

Furthermore, an inquiry section which, when a flight reservation is possible, makes a reservation using the passenger name selected by the second selecting section, can be used. Moreover, it is also possible to use an inquiry which further comprises a function whereby, when a flight reservation has been made, information for settlement of charges is issued to the management devices.

Furthermore, the transfer information management device may also be additionally provided with an instruction section whereby, when a reservation has been made by the inquiry section, an instruction is given to the management device managing baggage handling tasks, of the plurality of management devices, to transfer the baggage to the alternative flight on which a reservation has been made.

The transfer information management method of the present invention is used in a device connected to a plurality of management devices provided with databases wherein information relating to airport operations are stored, which manage airport operations by means of updating and referring to the contents of these databases. The transfer information management method comprises a read-out step, a create step, and a display control step. In the read-out step, information stored in the respective databases provided in the plurality of management devices is read out. The create step creates a transfer information database, which is a database wherein flight arrival information relating to flight arrivals, and flight departure information relating to flight departures are stored, and which contains information matching flight arrival information and flight departure information relating to the same passenger, on the basis of the information read out in the read-out step. In the display control step, the flight arrival information and flight departure information stored in the transfer information database is displayed on the display section, in a format whereby combinations of flight arrival and flight departure relating to the same passenger can be seen.

BRIEF DESCRIPTION OF THE DRAWINGS

FIG. 2 is a diagram showing information stored in a flight information database;

FIG. 3 is a diagram showing information stored in a baggage handling information database;

FIG. 5 is a diagram showing information stored in a passenger information database;

FIG. 7 is a diagram showing an overview of a flight arrival information database created during transfer information database creating and updating processing;

FIG. 8 is a diagram showing an overview of a flight departure information database created during transfer information database creating and updating processing;

FIG. 11 is a diagram showing one example of information displayed on a screen of an information display section by means of the process in step S201 in FIG. 10;

FIG. 12 is a diagram showing one example of information displayed on a screen of an information display section by means of the process in step S204 in FIG. 10;

FIG. 13 is a diagram showing one example of information displayed on a screen of an information display section by means of the process in step S206 in FIG. 10;

FIG. 16 is a compositional diagram of an alternative flight database.

FIG. 23 is a diagram showing one example of information displayed on a baggage handling terminal;

FIG. 24 is a diagram showing one example of information displayed on a baggage handling terminal, when a baggage transfer instruction is received by the baggage handling terminal from the transfer information management device;

DESCRIPTION OF THE PREFERRED EMBODIMENTS

Below, the transfer information management device of the present invention is described with reference to the drawings.

First Embodiment

The transfer information management device according to the first embodiment can provide to passengers or the like a variety of information which is helpful for making an airplane transfer. The transfer information management device obtains information forming the basis for this information from various databases used in an airport.

Figure 1:
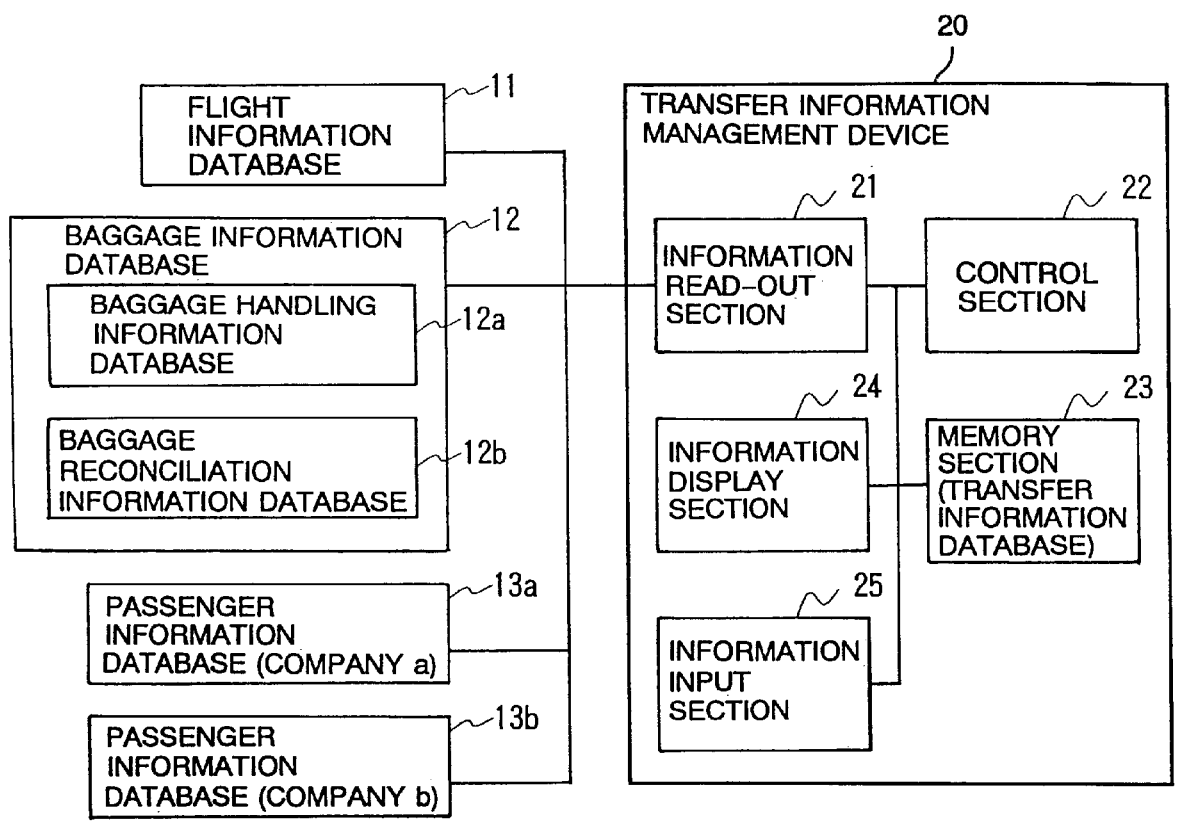
FIG. 1 is a block diagram showing the composition of a transfer information management device according to a first embodiment, and a use configuration of the same.

FIG. 1 shows the composition and use configuration of a transfer information management device according to the first embodiment. As shown in the diagram, the transfer information management device 20 is provided with an information read-out section 21, a control section 22, a memory section 23, an information display section 24, and an information input section 25, and it is used in connection with databases managed by other information management devices, namely, a flight information database 11, baggage information database 12, and passenger information database 13a, 13b.

Firstly, a simple description of the operation and application of each part comprising the transfer information management device 20 is given, using these diagrams.

Information read-out section 21 is an interface circuit with the various databases (memory devices where the databases are stored). Memory section 23 is a section for storing a transfer information database, which is a database integrating the data in the databases managed by the external systems, and it is constituted by a hard disk device. Information display section 24 is constituted by a CRT and peripheral circuits therefor (VRAM, display driver, and the like), and characters and diagrams corresponding to the given data are displayed on the CRT. Information input section 25 comprises a keyboard and a mouse and is provided adjacent to information display section 24.

Control section 22 is a control circuit for integrated control of the various sections in transfer information management device 20, and it is constituted by a CPU and peripheral circuits therefor (ROM, RAM, and the like).

Next, the information stored in each of the databases connected to transfer information management device 20 is described.

Flight information database 11 is a database which is referred to and updated by the flight information systems (omitted from drawings) operated by airport managers. As shown in FIG. 2, flight information database 11 stores the flight number, origin, destination, stopover, time information, status, assigned gate, and the like relating to each airplane used by the airport.

The flight number is identification information allocated to the airplane. The origin, destination and stopover are information items indicating, respectively, the origin, destination and stopover point of the airplane identified by the flight number. Time information comprises the scheduled, predicted and actual arrival and departure times for that airplane. The status is information indicating the current status of the airplane, for instance, whether the airplane is in flight, or has landed at the airport, or the like. The assigned gate is information indicating the gate allocated for that airplane.

Baggage information database 12 is a database used by baggage handling systems operated by the baggage handling staff. Baggage information database 12 comprises baggage handling information database 12a and baggage reconciliation information database 12b.

FIG. 3 shows the composition of baggage reconciliation information database 12b. As shown in the diagram, baggage reconciliation information database 12B stores flight number, time information and specific baggage information. The specific baggage information comprises the passenger name, baggage ID, origin, destination, stopover, weight and shape.

Baggage ID is identification information given to a passenger's baggage item identified by the passenger name. The weight and shape is information relating to the weight and shape of the baggage item. The origin, destination and stopover are information items indicating, respectively, the passenger's point of departure, destination and stopover points.

Figure 4:
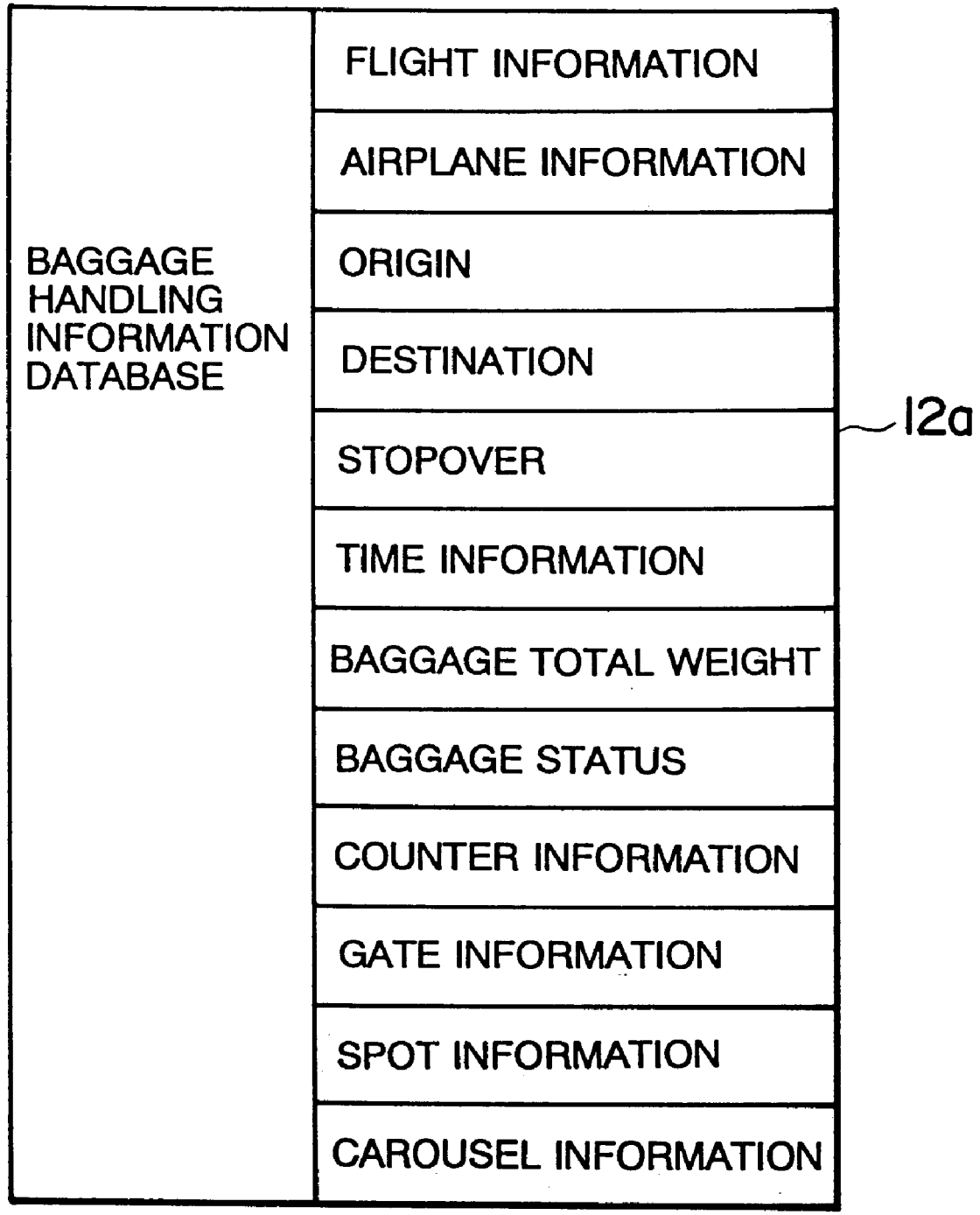
FIG. 4 is a diagram showing information stored in a baggage reconciliation information database.

FIG. 4 shows the composition of baggage handling information database 12a. As shown in the diagram, baggage handling information database 12a stores flight information, airplane information, origin, destination, stopover, time information, total baggage weight, baggage status, counter information, gate information, spot information, carousel information, and the like. The origin, destination and stopover stored in baggage handling information database 12a are information items indicating, respectively, the point of departure, destination and stopover points for airplanes.

Baggage handling information database 12a is used when loading baggage onto an airplane or unloading baggage from an airplane. For example, when loading baggage onto an airplane, baggage items registered at a counter specified by the counter information are loaded onto an airplane located at a position identified by gate information or spot information. Furthermore, when unloading baggage from an airplane (when returning baggage to passengers), the baggage in that airplane is conveyed to a carousel identified by the stored carousel information corresponding to that airplane.

FIG. 5 shows the composition of passenger information database 13. Passenger information database 13 is a database used by passenger information systems operated by airline companies. As shown in the diagram, passenger information database 13 stores flight number, airplane information, time information, status, counter information and specific passenger information. Specific passenger information comprises passenger name, passenger attributes, origin, destination, stopover, and the like.

The flight number, airplane information, time information and status in the passenger information database 13 are information items corresponding to the information items for the same name stored in flight information database 11. The counter information is counter identification information and is used to match an airplane with counters used for checking in. The origin, destination and stopover constituting the specific passenger information are information items indicating the origin, destination and stopover for a passenger identified by the passenger name stored corresponding to that information. Passenger information database 13 is updated when a reservation is made, or when boarding procedure is completed at the check-in counter, or the like.

A specific description of the operation of transfer information management device 20 (control section 22) is given below.

The processes implemented by control section 22 in transfer information management device 20 can be divided broadly into the transfer information database creating and updating process, which is conducted periodically, and the transfer information display process, which is implemented constantly.

Figure 6:
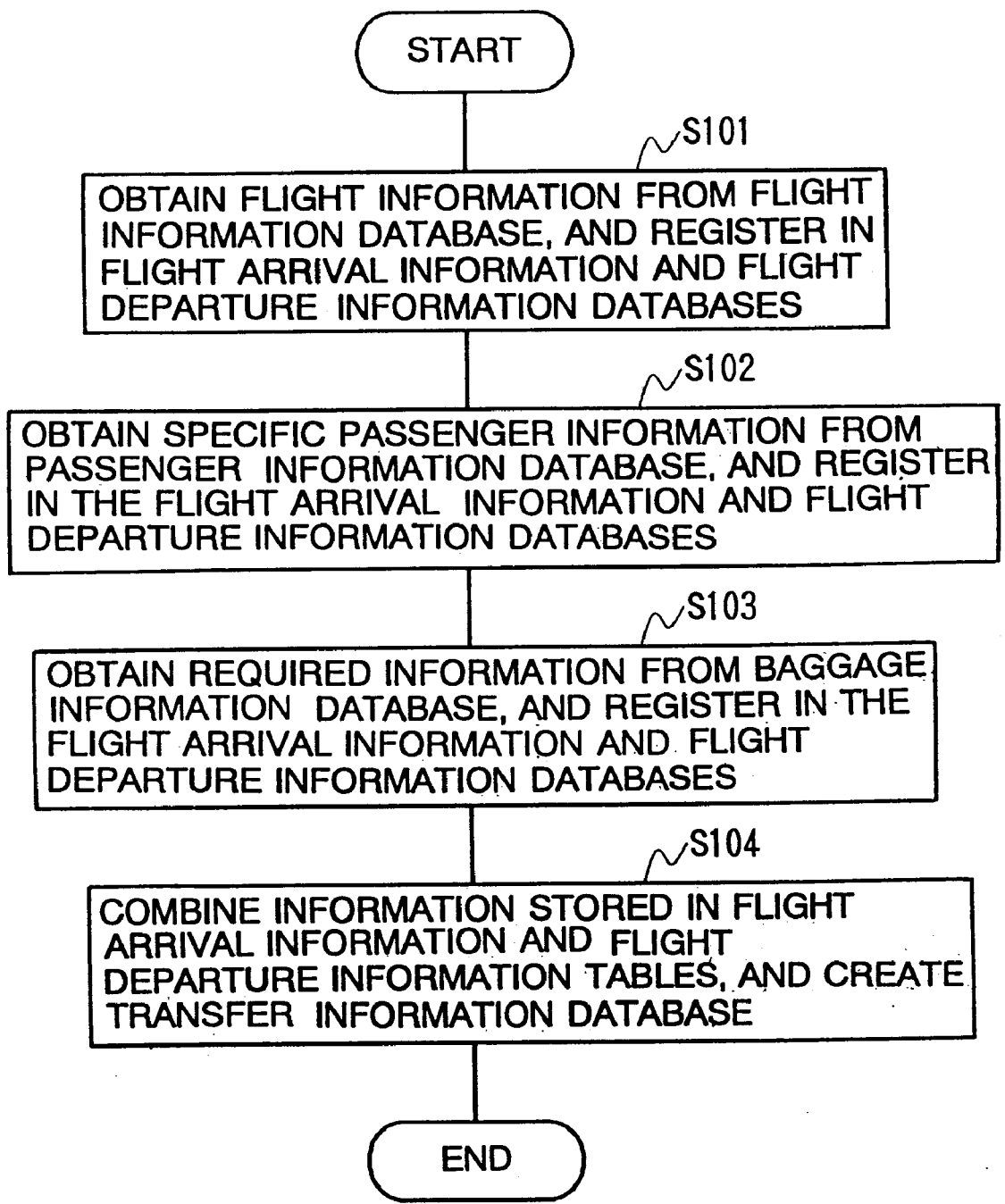
FIG. 6 is a flowchart of a transfer information database creating and updating process implemented by a control section in the transfer information management device according to the first embodiment.
Figure 9:
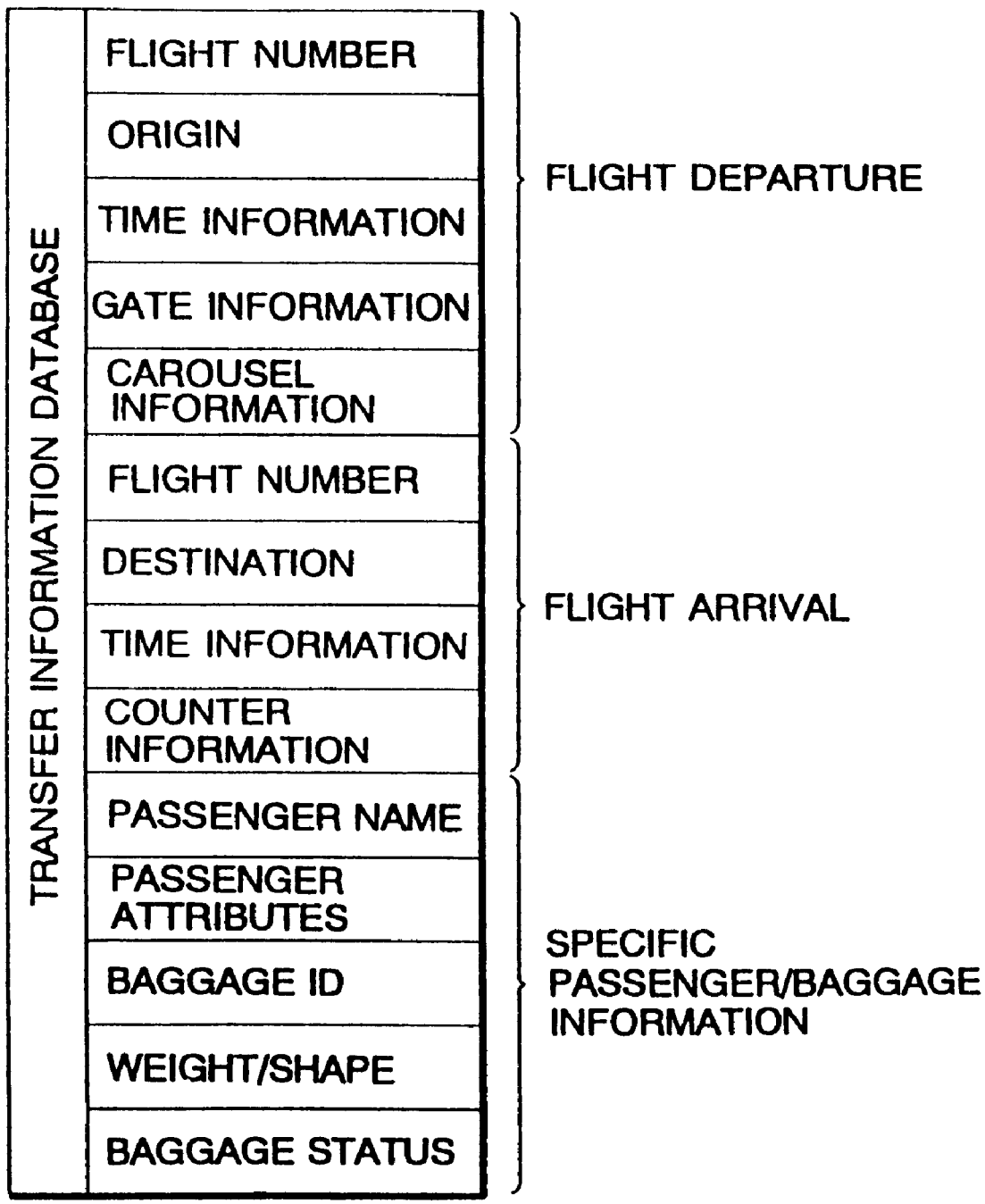
FIG. 9 is a diagram showing an overview of a transfer information database created during transfer information database creating and updating processing.

Firstly, the transfer information database creating and updating process is described, using FIG. 6 to FIG. 9. Of these diagrams, FIG. 6 is a flowchart showing the operational procedure of control section 22 during the transfer information database creating and updating process. FIG. 9 is a schematic diagram of the composition of the transfer information database, and FIG. 7 and FIG. 8, respectively, are schematic diagrams of the composition of a flight arrival information database and a flight departure information database set up in order to create a transfer information database.

In the transfer information database creating and updating process, control section 22 initially implements creation of the flight arrival information database and flight departure information database. As shown in FIG. 7 and FIG. 8, these databases store the information in databases 11 to 13.

Therefore, in order to create the flight arrival information database and flight departure information database, as shown in FIG. 6, firstly, control section 22 reads out all the flight information stored in flight information database 11. From the read flight information, it then registers flight information relating to flight arrivals in the flight arrival information database and registers flight information relating to flight departures in the flight departure information database (step S101).

Thereupon, with respect to passenger information databases 13a, 13b, control section 22 extracts the specific passenger information relating to each flight from passenger information database 13, by means of indexing using the flight numbers stored in the flight arrival information and flight departure information databases as index keys. The specific passenger information extracted is then matched with the flight numbers used as index keys and is registered in the flight arrival information or flight departure information database (step S102).

Thereupon, control section 22, using the flight numbers stored in the flight arrival information and flight departure information databases as index keys, extracts baggage status, counter information, and the like, from baggage handling information database 12a. The extracted baggage status or counter information, and the like, is then matched with the flight numbers used as index keys and is registered in the flight arrival information database or flight departure information database. Furthermore, control section 22 extracts baggage ID, weight and shape information stored in the flight arrival information database and flight departure information database from baggage reconciliation database 12b, using the flight numbers and passenger names stored in the flight arrival information database and flight departure information database as index keys. It then matches the extracted baggage ID, weight and shape information with the flight numbers and passenger names used as index keys, and registers this information in the flight arrival information database or flight departure information database (step S103).

After creating the flight arrival information database and flight departure information database in this way, control section 22 creates a transfer information database by combining the information stored in these databases (step S104).

As shown in FIG. 9, the transfer information database is a database which matches information relating to flight arrivals (flight number, time information, carousel information, or the like), information relating to flight departures (flight number, time information, counter information) and specific passenger and baggage information. When this database is created, control section 22 indexes the flight departure information database using the passenger names stored in the flight arrival information database as index keys. Thereupon, if the flight departure information database contains information having the same name as a passenger name stored in the flight arrival information database, control section 22 registers, in the transfer information database, information which combines information corresponding to that passenger name in the flight arrival information database, and information corresponding to that passenger name in the flight departure information database. In this case, control section 22 registers the baggage ID, weight/ shape, and baggage status for the desired person as stored in either the flight arrival information database or flight departure information database, in the transfer information database. For example, when an item of baggage is not checked in by the airline company managing a departing flight, the desired baggage ID, weight/shape, and baggage status will not be stored in the flight departure information database. In such cases, control section 22 stores the desired data, namely, the baggage ID, weight/shape and baggage status from the flight arrival database, into the transfer information database.

When a transfer information database has been created by a procedure of this kind, control section 22 ends the transfer information database creating and updating process. When a prescribed time has elapsed after ending the process, control section 22 implements the transfer information database creating and updating process once again. However, in the second or later transfer information database creating processes, control section 22 conducts a read-out from databases 11 to 13 of information that has changed since the previous read-out was conducted, and updates the contents of each database in memory section 23 on the basis of the information read out.

Next, a transfer information display process is described using FIG. 10 to FIG. 13.

Figure 10:
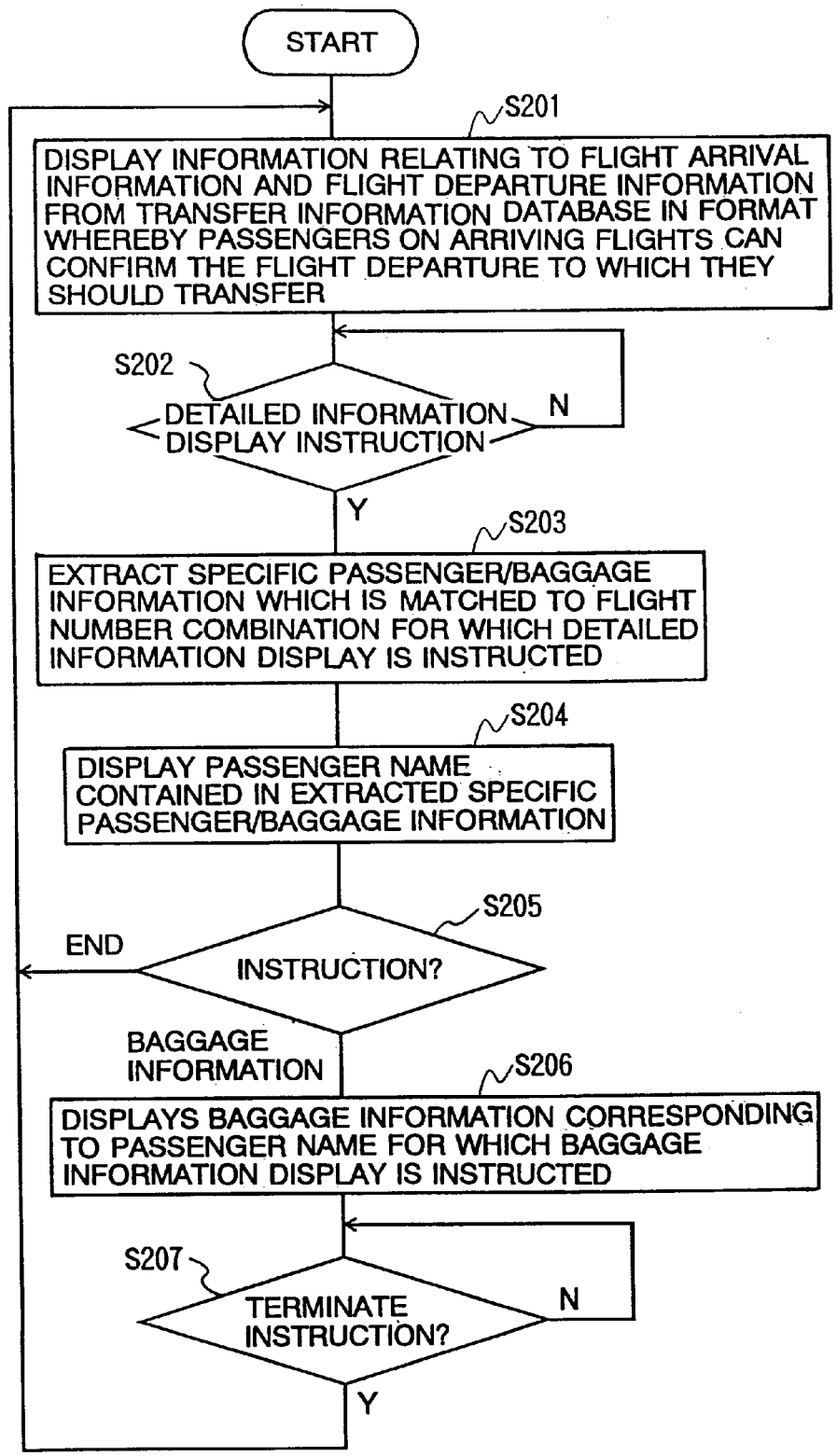
FIG. 10 is a flowchart of a transfer information display process implemented by the transfer information creating and updating section.

As shown in FIG. 10, at the start of the transfer information display process, control section 22 controls information display section 24 such that information relating to flight arrivals and flight departures in the transfer information database is displayed in a format whereby a passenger on any arriving flight is able to confirm the departing flight to which he/she should make a connection.

FIG. 11 shows one example of information displayed on a screen of information display section 24 by the process in step S201. As illustrated in the diagram, a table showing flight numbers, departure points and arrival times (time information) relating to flight arrivals, and a table showing flight numbers, destinations and departure times (time information) relating to flight departures, are displayed. Furthermore, arrows which match together an arriving flight and departing flight, where there is a passenger making a connection between the two flights, are also displayed.

For example, the two arrows from "JALO34" displayed in FIG. 11 indicate that aboard "JALO34" there is/are (or were) a passenger or passengers connecting to "ABC111" and a passengers or passengers connecting to "AAA222".

After information of this kind has been displayed, control section 22 switches to a monitoring state where it awaits input of a detailed information display instruction (step S202). In this step, if the mouse button is clicked with the mouse cursor positioned over any of the arrows, then control section 22 judges that a detailed information display instruction has been given, and it initiates step S203.

In step S203, control section 22 extracts stored specific passenger and baggage information that is matched to the two flight numbers corresponding to the selected arrow. Thereupon, control section 22 displays the passenger names contained in the extracted specific passenger and transfer information on information display section 24 (step S204).

For example, when control section 22 detects that arrow L1 on the screen shown in FIG. 11 has been selected, it confirms that an instruction has been given to display information relating to passengers making a connection between the two airplanes identified by "JALO34" and "ABC111". Control section 22 then indexes the transfer information database using these flight numbers as index keys, and displays the indexing results in the format shown in FIG. 12.

Thereupon, control section 22 switches to a standby state awaiting input of a terminate instruction or baggage information display instruction from information input section 23 (step S205). In step S205, if the mouse button is clicked with the mouse cursor positioned over a prescribed location on the screen, or if a prescribed key is pressed, control section 22 judges that a terminate instruction has been input. When a terminate instruction is input (step S205; stop), control section 22 recommences processing from step S201. In other words, control section 22 returns the display contents of information display section 24 to the display shown in FIG. 11 and then awaits input of a detailed information display instruction.

Furthermore, in step S205, if the mouse button is clicked with the mouse cursor positioned over any of the passenger names, control section 22 judges that an instruction has been given to display baggage information corresponding to that passenger name. When a baggage information display instruction is input (step S205; baggage information), control section 22 extracts information relating to the baggage corresponding to the passenger name specified on the baggage information display from the indexing results in step S204. It then controls information display section 24 such that the extracted information is displayed on the screen in information display section 24 (step S206).

For example, when "Yoshio Harada" is selected on the screen shown in FIG. 12, control section 22 extracts the baggage ID, weight/shape and baggage status information matched to the passenger name "Yoshio Harada" from the indexing results. Thereupon, as shown in FIG. 13, it controls information display section 24 such that the baggage information corresponding to "Yoshio Harada" is displayed in the section where the passenger name was previously displayed. The screen shown in FIG. 13 indicates that of the two baggage items belonging to "Yoshio Harada", a 25-kilogram suitcase is on JAL034, and a 15-kilogram golf bag has been transferred to ABC111.

After displaying the baggage information in this format, control section 22 switches to a standby state awaiting terminate instruction input from the information input section 23 (step S207). When a terminate instruction is input (step S207; Y), control section 22 recommences processing from step S201.

Incidentally, although not shown in the flowchart, if the timing at which the transfer information database creating process is to be implemented occurs during implementation of steps S202, S205 or S207, the transfer information display process is suspended and the transfer information database creating and updating process is implemented. Thereupon, control section 22 changes the display contents in accordance with the updated transfer information database contents and recommences the suspended process.

In this way, by means of transfer information management device 20 according to the first embodiment, information required for making airplane transfers and information relating to baggage status (location) are displayed by information display section 24. This means that users of the present device (passengers and airport staff) are able to confirm readily the airplane to which a passenger must make a connection, and the status of each passenger's baggage. Furthermore, since the present transfer information management device simply reads out information from various databases, it can be connected to existing systems without needing to change the composition of the existing systems.

A variety of modifications are possible with the transfer information management device according to the first embodiment. For example, it is possible to construct the device such that, in addition to allowing input of information stored as passenger attributes upon selection of a passenger name, information relating to baggage is displayed only in cases where the input information agrees with the information in the transfer information database. Moreover, it may also be constructed such that a transfer information database alone is created, without setting up a flight arrival information database or flight departure information database.

Furthermore, it is also possible to construct a transfer information management device such that, rather than accessing each database periodically, it accesses a database that has changed when a notification of change in database contents is received from the information management devices controlling each of the databases.

Second Embodiment

The transfer information management device in a second embodiment is a device wherein a function (an alternative flight information display process) for making alternative flight reservations is appended to the transfer information management device according to the first embodiment. The alternative flight information display process, are initiated when a passenger is unable to board the departing flight on which a reservation was made, because the arriving flight was unable to reach the airport at the scheduled time, or when the departing flight is no longer to be operated as scheduled.

Figure 14:
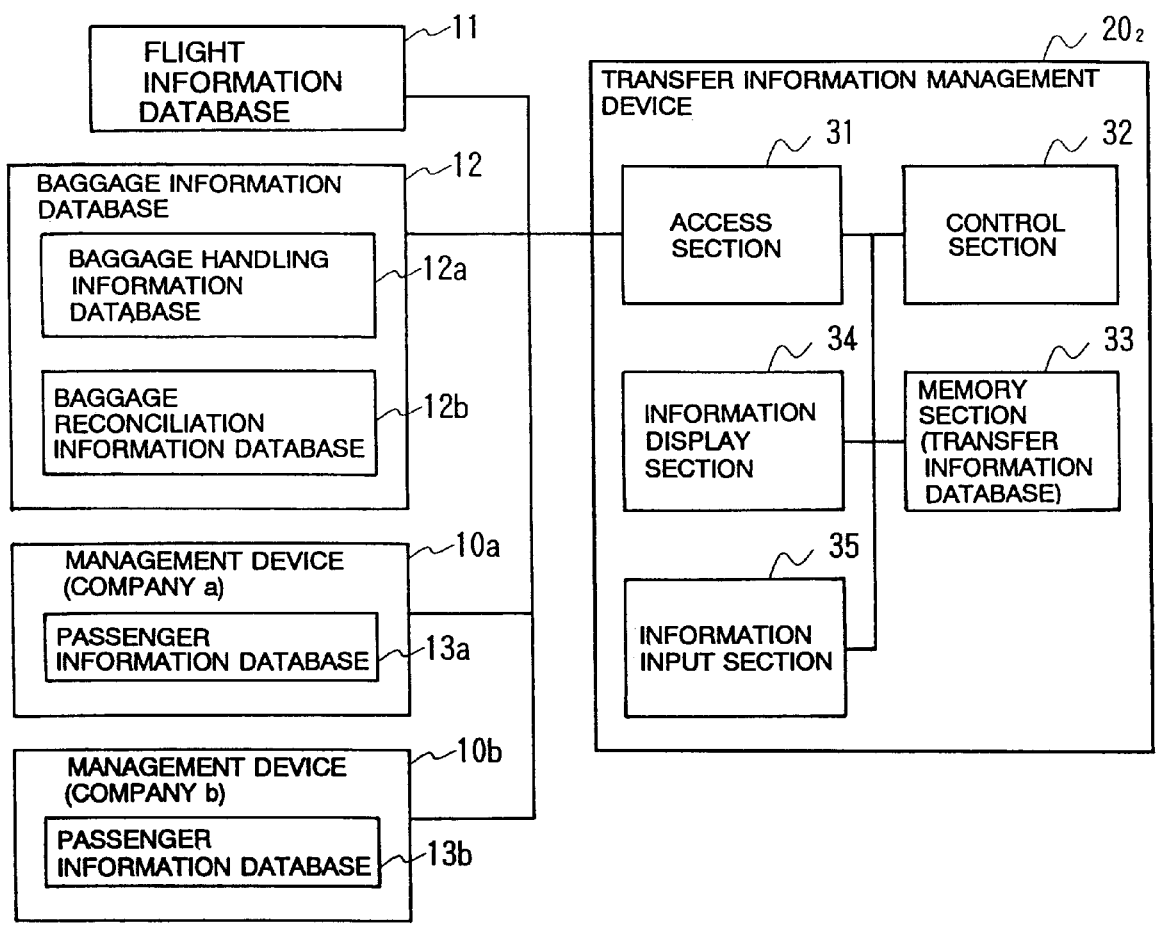
FIG. 14 is a block diagram showing the composition of a transfer information management device according to a second embodiment, and the use configuration of the same.

FIG. 14 shows the composition and configuration of connections in the transfer information management device according to the second embodiment. As shown in the diagram, the transfer information management device 202 according to the second embodiment is connected to management devices 10a, 10b, in addition to being connected to the various databases 11 to 13. Management devices 10 are devices operated by airline companies for receiving airplane flight reservations or cancellations. They manage particular passenger information databases 13. Furthermore, each of the management devices 10 has a function for making a flight reservation on an airplane or cancelling a reservation by means of a communications circuit, rather than manually.

As the diagram shows, transfer information management device 202 is provided with an access section 31, a control section 32, a memory section 33, an information display section 34 and an information input section 35. Access section 31 is a unit corresponding to information read-out section 21, and in addition to the functions provided in information read-out section 21, it is also provided with a function for exchange of messages between the management devices 10. Memory section 33, information display section 34 and information input section 35, respectively, have the same functions as information display section 23, memory section 24 and information input section 25. Control section 32 controls each section in a similar way to control section 22. However, in place of the transfer information database creating and updating process and the transfer information display process, control section 32 implements a transfer information/alternative flight information database creating and updating process and transfer information/alternative flight information display process, respectively.

Figure 15:
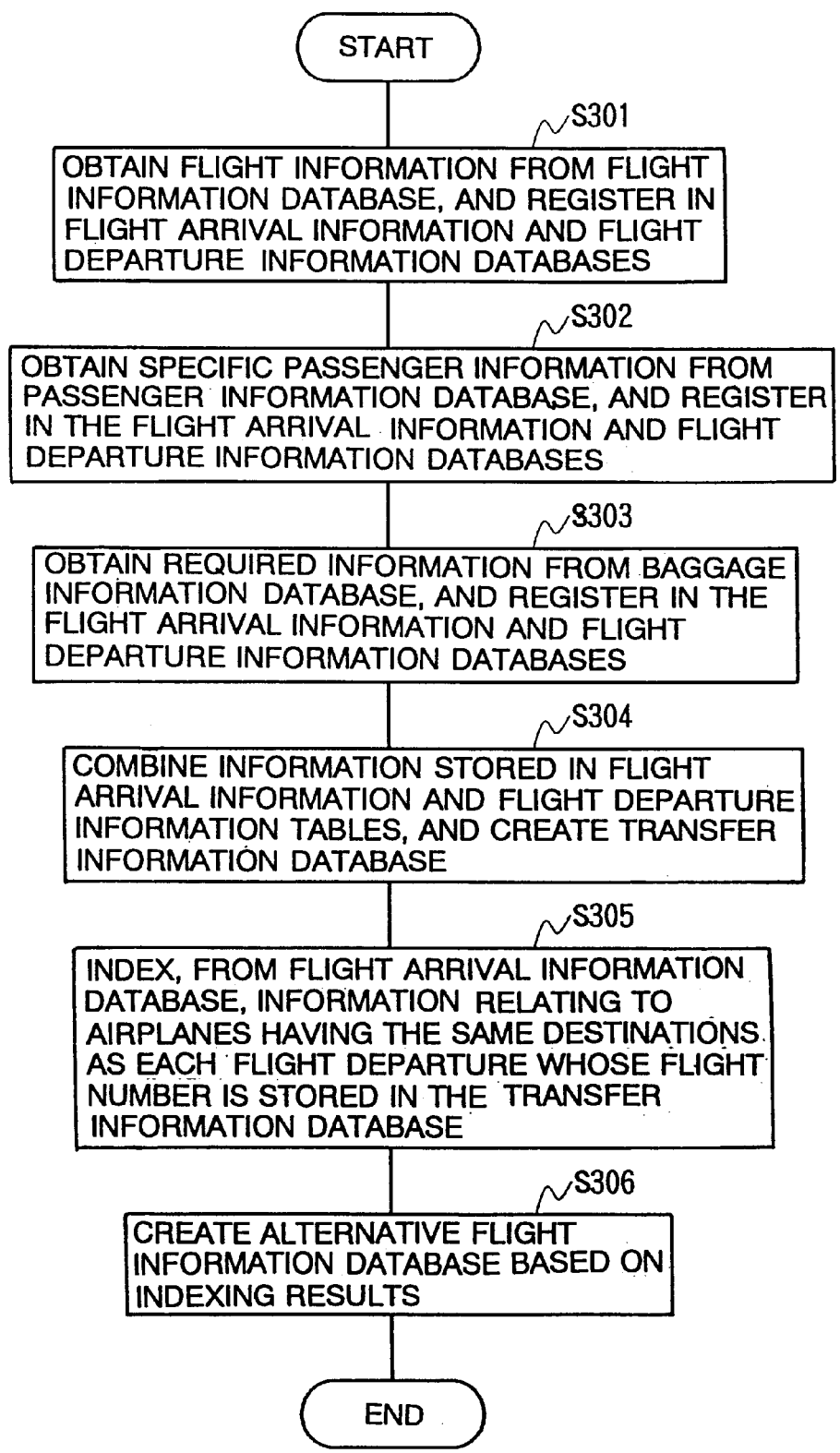
FIG. 15 is a flowchart of a transfer information and alternative flight information creating and updating process implemented by a control section in the transfer information management device according to the second embodiment.

Firstly, details of the transfer information/alternative flight information database creating and updating process are explained using FIG. 15. As shown in the diagram, at the start of this process, control section 32 implements the same process as that in steps S101 to S104 in the transfer information database creating and updating process (FIG. 7) (steps S301 to 304). Thereupon, control section 32 indexes the information (flight number, time information and the like) relating to airplanes having the same destination as each of the departing flights whose flight numbers are stored in the transfer information database created in step S304, from the flight departure information database (step S305). Based on the results of this indexing, control section 32 then creates an alternative flight information database where the flight numbers of departing flights are matched with information (flight number, destination, time information, and the like) relating to other flight departures and are stored (step S306), as illustrated in FIG. 16, and the process then terminates.

Next, the transfer information/alternative flight information display process is described.

Figure 17:
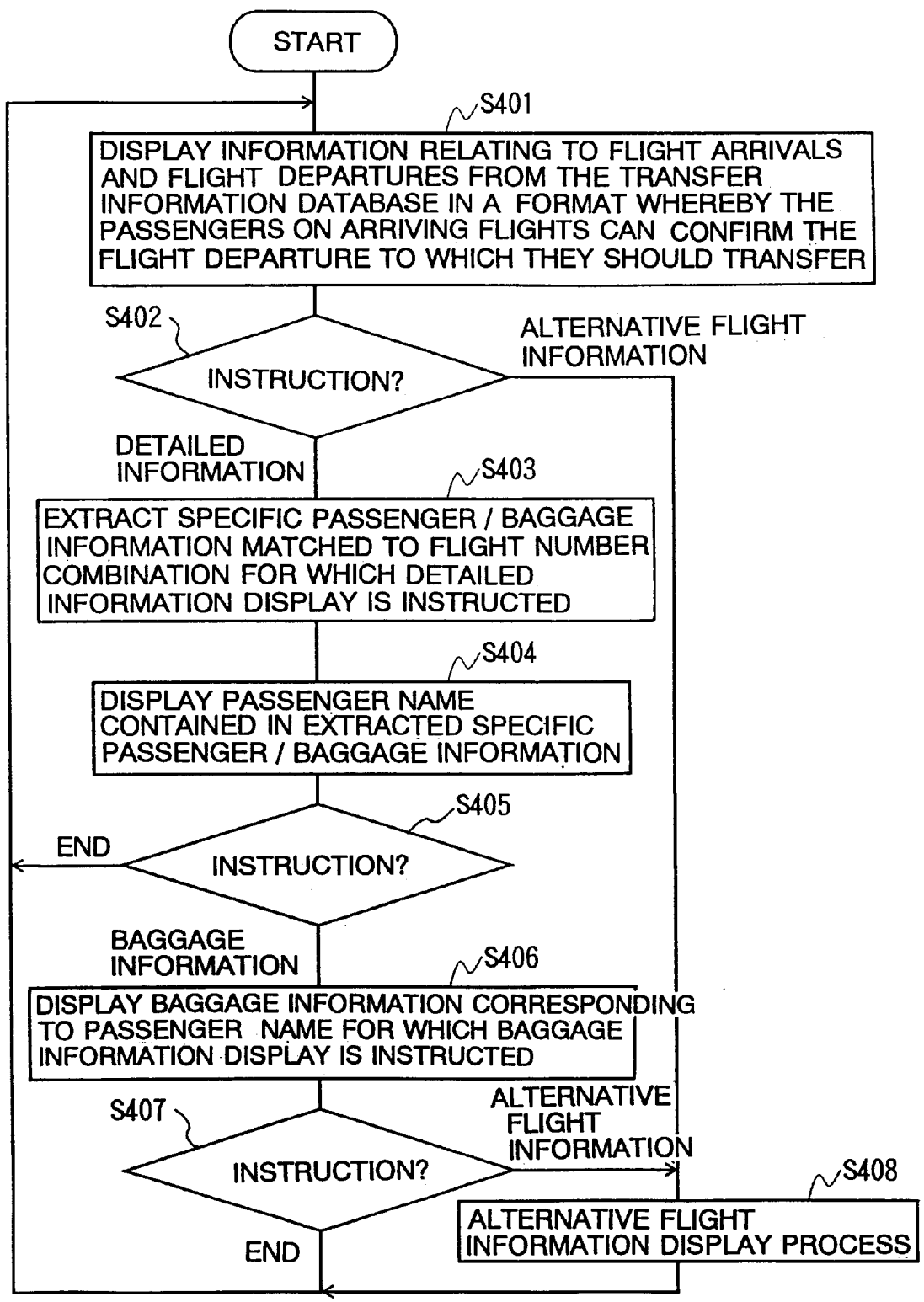
FIG. 17 is a flowchart of a transfer information and alternative flight information display process implemented by the control section in the transfer information management device according to the second embodiment.

FIG. 17 shows the operational procedure of control section 32 in transfer information/alternative flight information display processing. As shown in the diagram, in steps S401 to S407 in the transfer information/alternative flight information display process, the same or similar processing to that in steps S301 to 307 in the transfer information display process (FIG. 10) is implemented, respectively. However, at step S402, control section 32 receives input of alternative flight information display instructions, in addition to detailed information display instructions. Therefore, if an alternative flight information display instruction is input (step 402; alternative flight information), control section 32 implements an alternative flight information display process (step S408). Furthermore, at step S402, if control section 32 detects that one of the departing flight numbers displayed on the screen (see FIG. 11) has been selected using the mouse, then it judges that an instruction has been given to display the alternative flight information relating to that flight departure.

Moreover, control section 32 also receives input of alternative flight information display instructions at step S407. Therefore, if an alternative flight information display instruction is input (step S407; alternative flight information), control section 32 implements an alternative flight information display process (step S408). At step S407, if control section 32 detects that a region where information relating to a flight arrival or flight departure is displayed on the screen (see FIG. 13) has been selected using the mouse, then it judges that an instruction has been input to display alternative flight information relating to the flight departure currently displayed on the screen.

Figure 18:
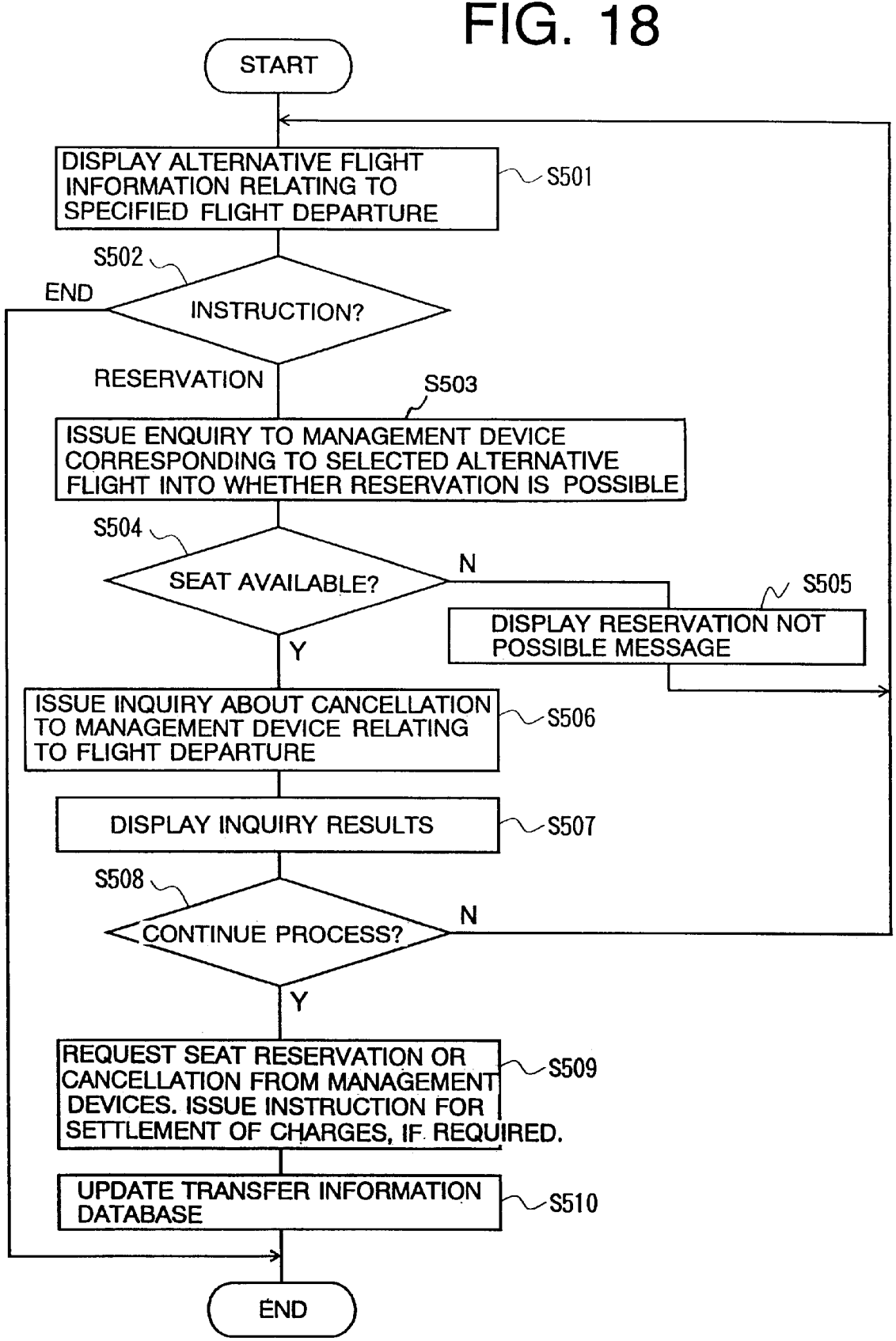
FIG. 18 is a flowchart of an alternative flight information display process implemented by the control section in the transfer information management device according to the second embodiment.

FIG. 18 shows the operational procedure of control section 32 during alternative flight information display processing.

As shown in the diagram, in the alternative flight information display process, firstly, control section 32 extracts from the database alternative flight information matched to the flight number of the departing flights specified on the alternative flight information display, and it displays the extracted alternative flight information on information display section 34 (step S501).

Figure 19:
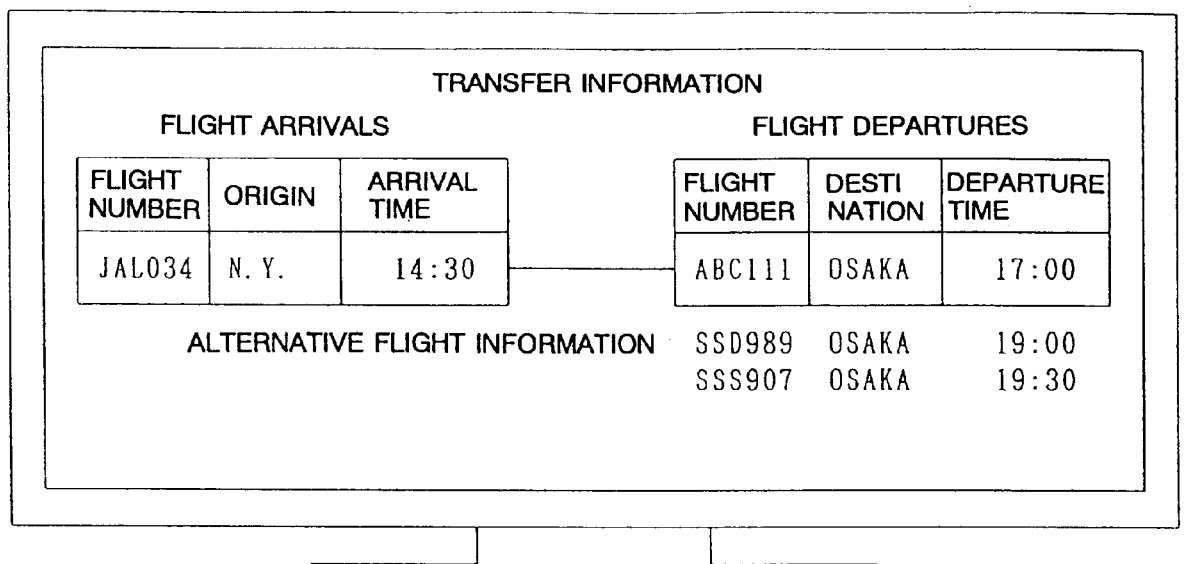
FIG. 19 is a diagram showing one example of information displayed on a screen of an information display section by means the process in step S501 in FIG. 18.

FIG. 19 shows one example of information displayed on a screen of information display section 34. This diagram shows an example of a screen displayed in a case where the flight departure number "ABC111" is selected on the screen shown in FIG. 11.

In this way, at step S501, control section 32 implements display of information (alternative flight information) relating to airplanes having the same destination as the indicated flight departure.

Thereupon, control section 32 switches to a standby state awaiting information input from information input section 35 (step S502). When it detects that a terminate instruction has been implemented, it terminates the alternative flight display process (and returns to step S401 in FIG. 17).

On the other hand, when control section 32 detects that one of the alternative flight information items displayed on the screen has been selected using the mouse (step S502: reservation), it issues an inquiry to the management device corresponding to the selected alternative flight, to determine whether or not a reservation for that flight is possible (step S503). If the management device subject to the inquiry gives a notification that a flight reservation is not possible (step S504; N), then a 'reservation not possible' message is displayed on information display section 34 (step S505), and the process returns to step S501.

On the other hand, if the management device subject to the inquiry gives a notification that a flight reservation is possible (step S504; Y), then control section 32 issues a reservation cancellation inquiry to the management device controlling the flight departure displayed on information display section 34 (step S506). Thereupon, control section 32 receives a reply message (including information relating to cancellation charges) output by that management device in response to the inquiry, and it displays information corresponding to this reply message (inquiry results) on information display section 34 (step S507). At this step, control section 32 displays as inquiry results, on information display section 34, information such as "Charges for the alternative flight are to be paid by Company XXX" or "Charges for the alternative flight and cancellation fees are to be paid by the customer."

Users of the device take into consideration the inquiry results displayed and decide whether or not to cancel their reserved flight departure and book an alternative flight. If the user then makes a cancellation or reservation by means of operating information input section 35, this indicates continuation of the process, and if no cancellation or reservation is made, this indicates termination of the process.

Upon displaying the inquiry results, control section 32 switches to a monitoring state awaiting input of information (signals) from information input section 35, and when an instruction is given to terminate the process (step S508; N), it returns to step S501. On the other hand, if an instruction is given to continue the process (step S508; Y), control section 32 makes a flight reservation or cancellation request to the management devices. Furthermore, if necessary, it issues an instruction for settlement of charges to the management devices (step S509). Moreover, although this is omitted from the drawing, since a passenger name is not selected in the alternative flight information display processing implemented after step S402, a process to obtain the passenger name is conducted immediately after step S508.

Thereupon, control section 32 updates the transfer information database in accordance with the processing implemented in step S509 (step S510), and then terminates the process (and returns to step S401 in FIG. 17.)

Figure 20:
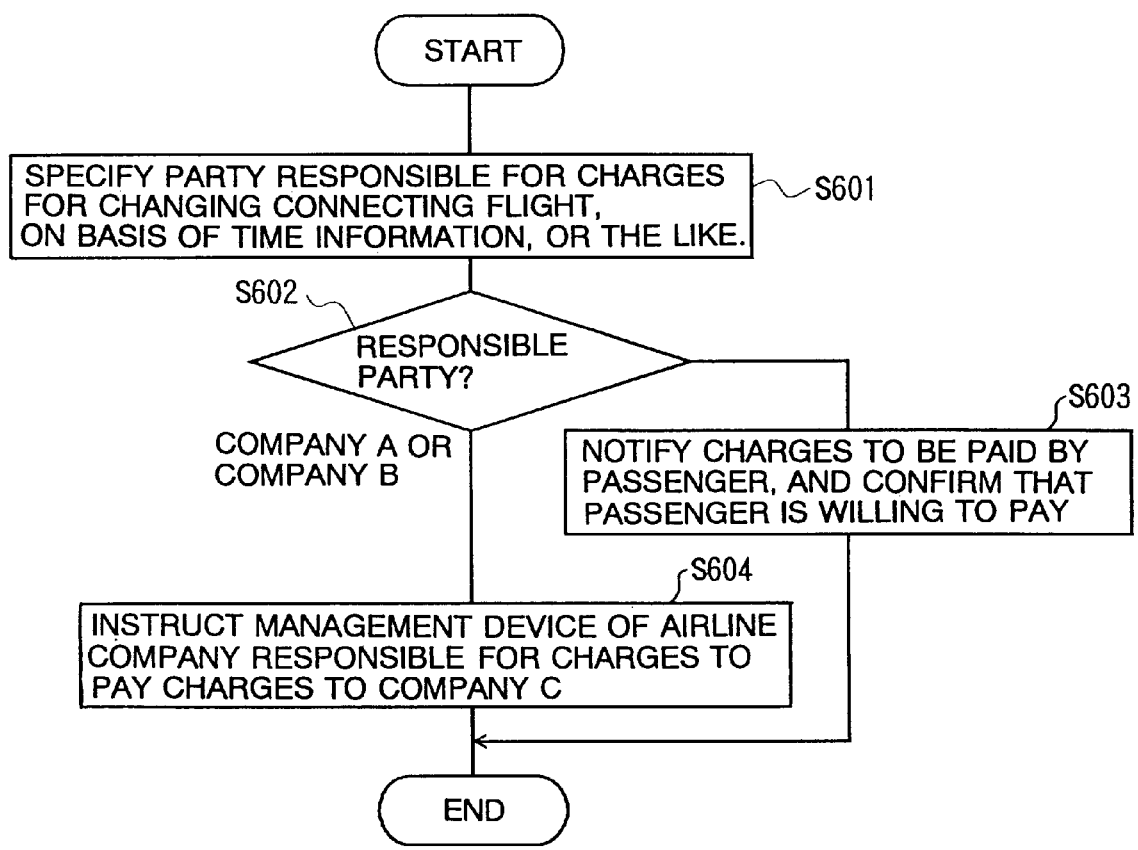
FIG. 20 is a flowchart showing an overview of an instruction issuing procedure for charge settlement in the alternative flight display process.

Here, a brief description is given of the procedure for issuing a charge settlement instruction in the alternative flight information display process, using FIG. 20. The flowchart shown in FIG. 20 illustrates only the processing related to settlement of charges during alternative flight information display processing, and it is not a process implemented at any particular step in the alternative flight information display process. Furthermore, FIG. 20 shows the case of a passenger who was scheduled to make a connection from an airplane operated by company A to a airplane operated by company B, and who has changed their connecting flight to an airplane operated by company C.

As shown in the diagram, firstly, control section 32 specifies the party responsible for the charges required for the change of transfer, on the basis of time information and the like relating to the planes of company A and company B (step S601). At this step, control section 32 specifies the responsible party on the basis of predetermined rules (conditions). For example, if an alternative flight has to be used because the arriving flight arrived later than the allowed time, then control section 32 sets company A as the responsible party. Furthermore, in cases where an alternative flight is used because the departing flight cannot leave on schedule, or because of over-booking, then control section 32 sets company B as the responsible party. In addition, if the current situation does not match the various set rules, then the passenger is taken as the responsible party. Incidentally, this step S601 is implemented when step S506 in FIG. 19 is implemented.

When control section 32 sets the passenger as the responsible party (step S602; passenger), the charge to be paid is indicated to the customer, and it is confirmed that the customer is willing to pay the charge (step S603). On the other hand, if company A or company B are the responsible party (step S602; company A or company B), then control section 32 instructs the airline company responsible for the charges (company A or company B) to pay the charges to company C, and it notifies company C to the effect that the charges are to be paid by that airline company (step S604).

Third embodiment

The transfer information management device according to a third embodiment is a device wherein a function for managing the location of baggage items is appended to the transfer information management device according to the second embodiment.

Firstly, the composition and general operation of a baggage handling system connected to the transfer information management device according to the third embodiment will be described.

Figure 21:
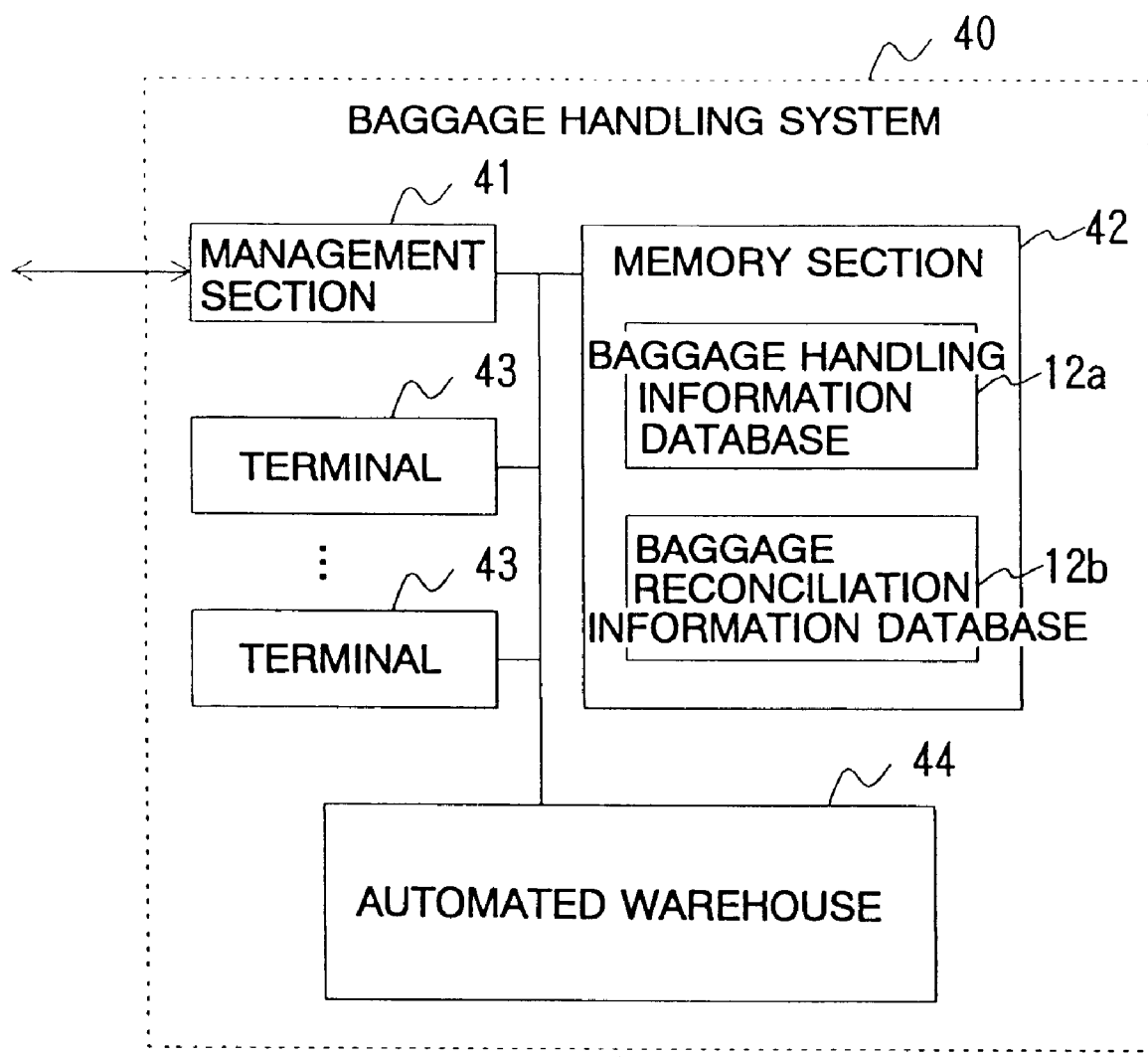
FIG. 21 is a compositional diagram of a baggage handling system connected to a transfer information management device according to a third embodiment.

As shown in FIG. 21, a baggage handling system 40 comprises a management section 41, a memory section 42, a plurality of terminals 43, and an automated warehouse 44. Terminals 43 are so-called computer terminals and are provided with monitors for displaying various information, bar code readers, and keyboards. A bar code reader is used to read a bar code indicating flight number and baggage ID from a tag attached to a baggage item. Memory section 42 stores a baggage handling information database 12a and a baggage reconciliation information database 12b. Automated warehouse 44 is a warehouse for temporary storage of baggage items and is provided with automatic baggage loading and unloading mechanisms.

Management section 41 performs various control functions, as described below.

When new information is issued by another management device, management section 41 registers this information in database 12 in memory section 42. Furthermore, when a baggage information output request relating to a certain baggage item is received from one of the terminals, management section 41 extracts information relating to the delivery point for that baggage item from database 12, using the flight number and baggage ID contained in the output request, and outputs the extracted information to that terminal. Moreover, when an information write request is received from a terminal, information corresponding to that write request is written into database 12 in memory section 42.

Figure 22:
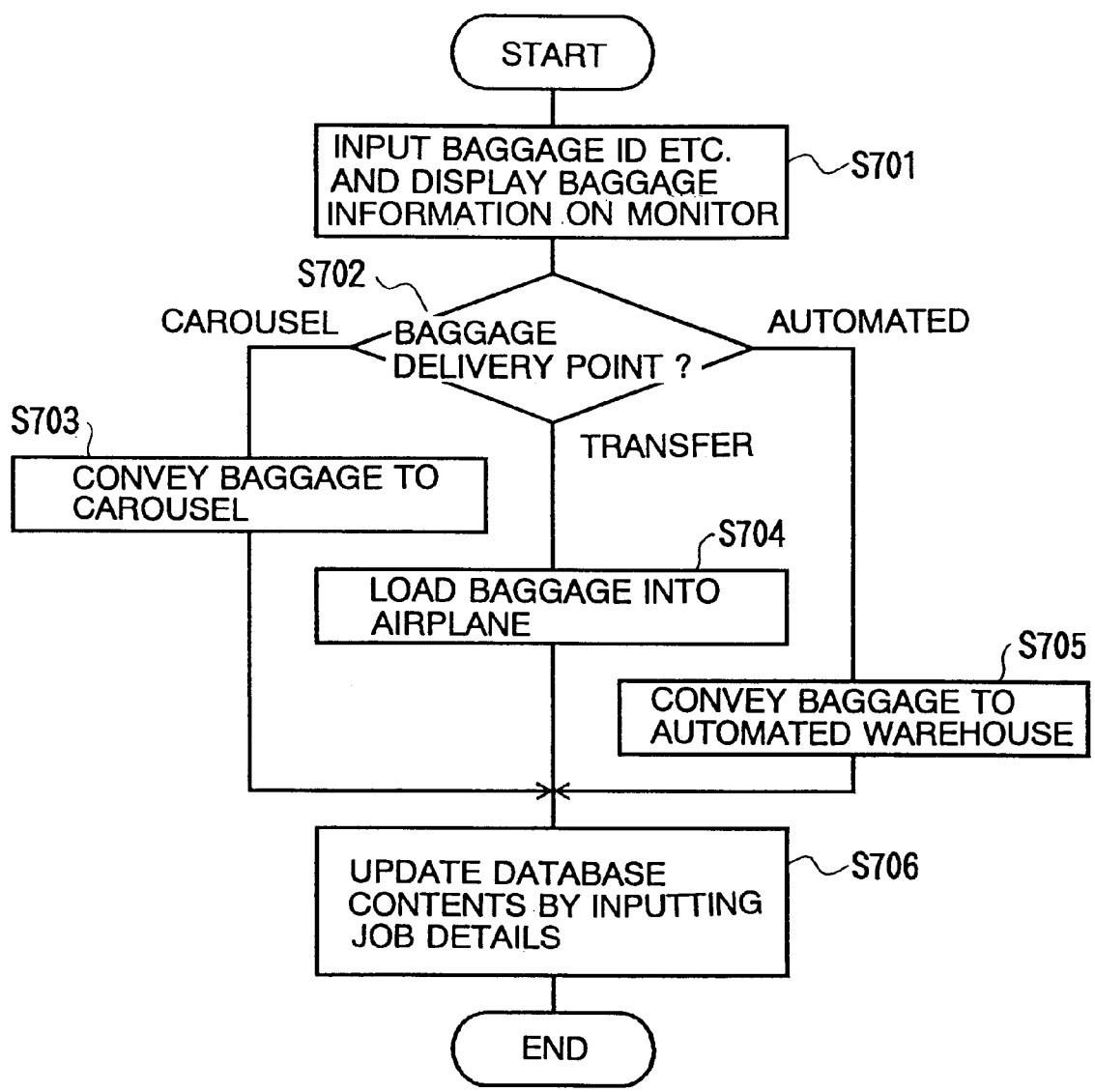
FIG. 22 is a flowchart showing a use procedure for the baggage handling system.

For example, when baggage is unloaded from an arriving flight, as shown in FIG. 22, the operator, by inputting at terminal 43 the baggage ID for the baggage items to be processed, can have the baggage information relating to those baggage items displayed on the monitor at terminal 43 (step S701). Information such as that shown in FIG. 23, for example, can also be displayed on the monitor.

Therefore, the operator confirms the delivery point for baggage items from the display on the monitor (step S702), and distributes the baggage between carousel, airplane and automated warehouse (step S703 to S705). Thereupon, by inputting job details at terminal 43, the operator updates the contents of database 12 in management section 41 (step S706).

Moreover, when loading baggage onto a departing flight, by inputting the flight number for the departing flight at terminal 43, the operator can have the baggage information relating to the baggage items to be loaded onto that departing flight displayed on the monitor at terminal 43 by management section 41. The operator then confirms from the display on the monitor the baggage items that are to be loaded onto the departing flight, and conducts the necessary procedures for loading that baggage onto the departing flight. Furthermore, when baggage is shifted in location during these procedures, the operator uses terminal 43 to notify management section 41 that the baggage location (status) has changed. Management section 41 updates the contents of database 12 in accordance with this notification.

Furthermore, when management section 41 receives a baggage transfer instruction (detailed below) from the transfer information management device, these instruction details are displayed on the monitor at terminal 43 relating to that baggage item. For example, in a case where an instruction is given to transfer a baggage item having a baggage ID of BGO2394 to gate 11, management section 41 displays an emergency message instructing transfer of that baggage item on the monitor at terminal 43, as shown in FIG. 24.

Next, the operation of the transfer information management device according to the third embodiment is described. Only those parts that differ from the transfer information management device and operation according to the second embodiment are described here.

Figure 25:
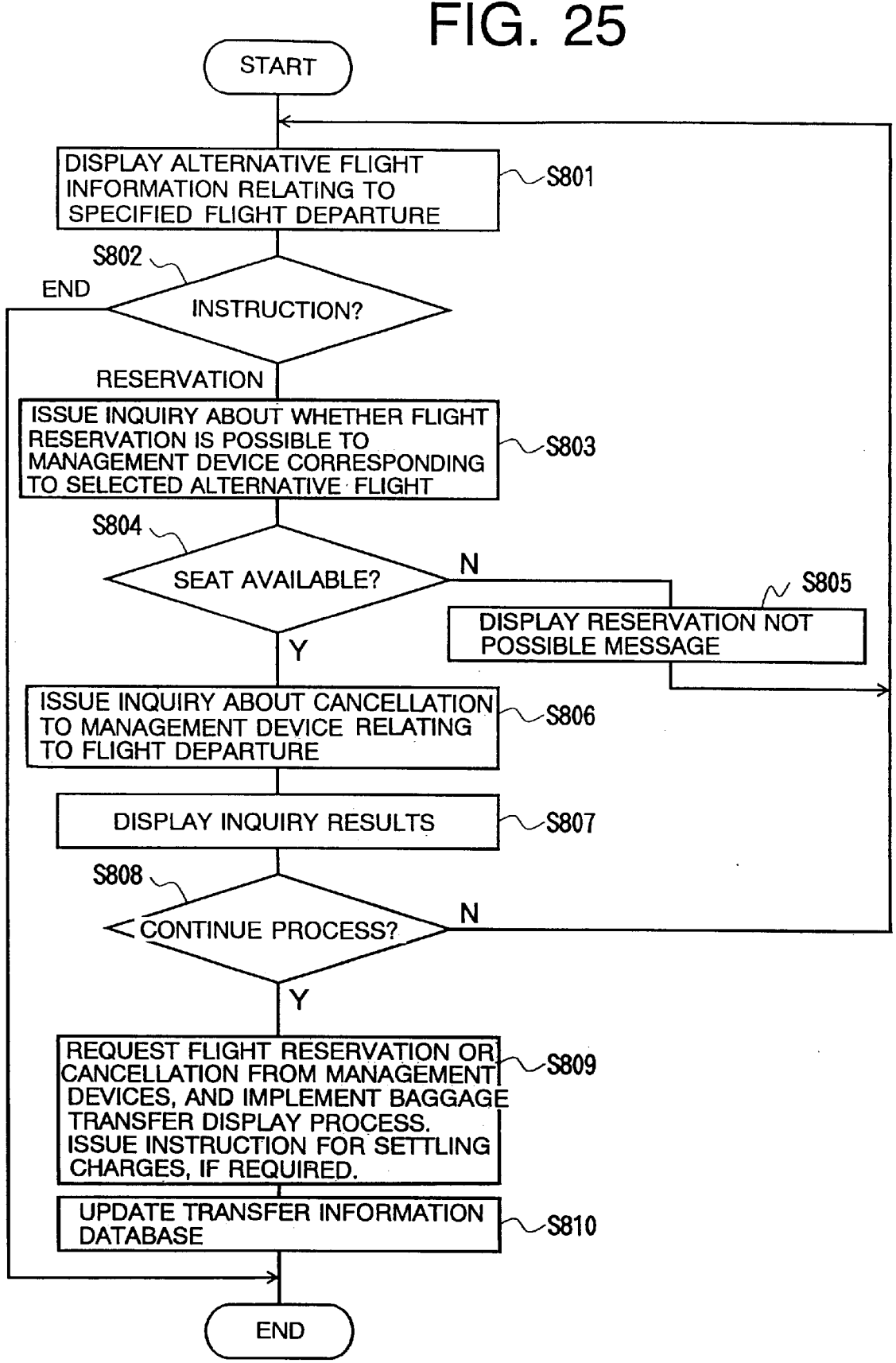
FIG. 25 is a flowchart of an alternative flight information display process implemented by a control section in the transfer information management device according to the third embodiment.

FIG. 25 shows a flowchart of the alternative flight information display process implemented in the transfer information management device according to the third embodiment. As the diagram clearly shows, at the majority of the steps in the alternative flight information display processing implemented in the present transfer information management device, the same processes are implemented as at the corresponding steps in the alternative flight information display processing according to the second embodiment. However, in step S809, in addition to a flight reservation request and cancellation request to the management devices, a baggage transfer instruction process, which instructs the baggage handling system to transfer baggage items, is also implemented.

Figure 26:
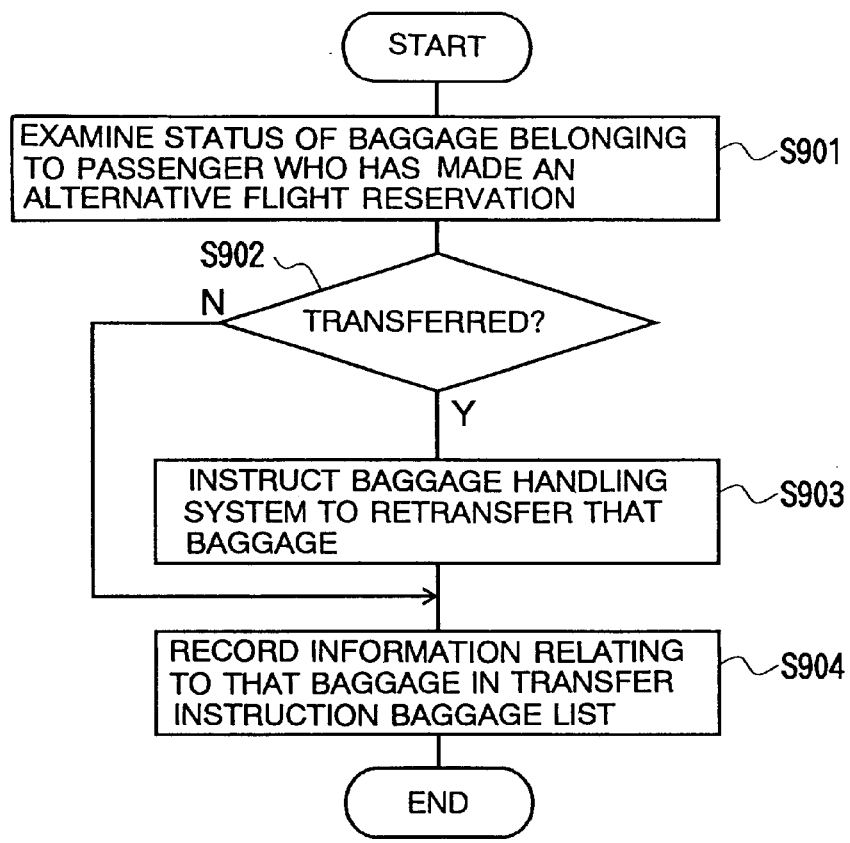
FIG. 26 is a flowchart of a baggage transfer instruction process implemented in the alternative flight information display process shown in FIG. 25.

FIG. 26 shows a flowchart of the baggage transfer instruction process. As shown in the diagram, during baggage transfer processing, firstly, the control section examines the status of the baggage belonging to a passenger who has made an alternative flight reservation, using the transfer information database (step S901). If this baggage has already been transferred (step S902: Y), in other words, if it has been wrongly transferred, the control section instructs the baggage handling system to retransfer this baggage (step S908). Thereupon, the control section registers information relating to that baggage in the transfer instruction baggage list (step S904).

On the other hand, if the baggage has not been transferred (step S902; N), the control section records the information relating to this baggage in the transfer instruction baggage list (step S904) and then terminates the process (and implements the remaining processes in step S809).

Figure 27:
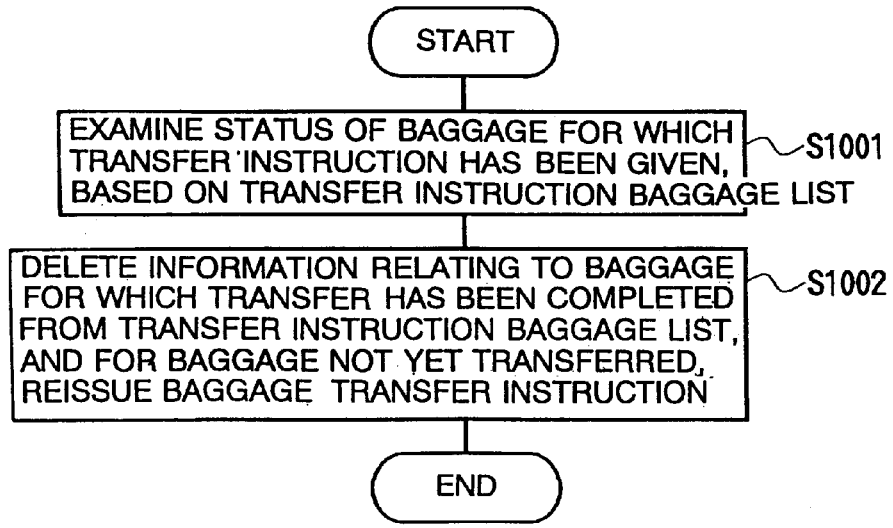
FIG. 27 is a flowchart of a baggage transfer confirmation process implemented by the control section in the transfer information management device according to the third embodiment.

Lastly, the baggage transfer monitoring process implemented by the transfer information management device according to the third embodiment will be described, using FIG. 27. The baggage transfer monitoring process is implemented periodically in parallel with the transfer information/alternative flight information database creating and updating process, and the transfer information/alternative flight information display process.

As shown in the diagram, in the baggage transfer monitoring process, the control section monitors the status of each baggage item recorded in the transfer instruction baggage list, by means of reading out information from the transfer information database (step S1001). If there are baggage items for which transfer has been completed, the control section then deletes the information relating to that baggage item from the transfer instruction baggage list, and if there are baggage items for which transfer has not been completed, or baggage items which have been wrongly transferred, a transfer instruction for that baggage item is issued once again to the baggage handling system (step S1002).

In this way, the transfer information management device according to the third embodiment monitors the transfer status of the baggage belonging to a passenger, when an alternative flight reservation is made for that passenger. This means that when the present transfer information management device is used, baggage is reliably conveyed to the alternative flight.

What is claimed is:

1. A transfer information management device connected to a plurality of management devices each of which manages airport operations by means of updating and referring to a database, comprising:

display means;

read-out means for reading out flight information stored in the databases provided respectively in the plurality of information management devices;

creating means for creating a flight arrival information database storing flight arrival information from the flight information read out by said read-out means, a flight departure information database storing flight departure information from the flight information read out by said read-out means, wherein passenger information is extracted from a passenger information database using index keys from said flight arrival information database and said flight departure information database and stored in said flight arrival information database and said flight departure information database;

combining means for combining the flight arrival information with the flight departure information in a transfer information database, wherein flight arrival information having a passenger information index key matching a passenger information index key from the flight departure information is combined in the transfer information database; and display control means for displaying, on said display means, the flight arrival information and flight departure information stored in the transfer information database, in a format whereby combinations of flight arrival and flight departure relating to the same passenger can be seen using said passenger information index key.

2. A transfer information management device according to claim 1, wherein the passenger information index key is a passenger name, and said combining means combines baggage information from a baggage information database with the transfer information database in accordance with the passenger information index key, the transfer information device further comprising:

second display control means for displaying, on the display means, the passenger names from the transfer information database corresponding to the combination of flight arrival information and flight departure information selected by the first selecting means; and third display control means for displaying, on the display means, baggage information from the transfer information database corresponding to the passenger names.

3. A transfer information management device according to claim 2, further comprising:

flight departure information selecting means for selecting one flight departure information item from the flight arrival information and flight departure information displayed by the display control means; and alternative flight information display control means for displaying in the form of alternative flight information on the display means, further flight departure information from the transfer information database having the same destination as the flight departure information selected by said flight departure information selecting means.

4. A transfer information management device according to claim 3, further comprising:

alternative flight information selecting means for selecting one alternative flight information item from the alternative flight information displayed by the alternative flight information display control means; and inquiry means for inquiring, with respect to a management device managing flight departures corresponding to the alternative flight information selected by this alternative flight information selecting means, whether a flight reservation is possible, and displaying the results of this inquiry on the display means.

5. A transfer information management device according to claim 4, wherein when a flight reservation is possible, the inquiry means make a reservation using the passenger name selected by a second selecting means.

6. A transfer information management device according to claim 5, wherein when the flight reservation has been made, the inquiry means issue information for settlement of charges to the management device.

7. A transfer information management device according to claim 5, further comprising:

instruction means for instructing a management device managing baggage transfer operations, of the plurality of management devices, to transfer baggage to an alternative flight where a reservation has been made, when a reservation has been made by the inquiry means.

8. A transfer information management method used in a device connected to a plurality of management devices provided with databases wherein information relating to airport operations are stored, which manage airport operations by means of updating and referring to the contents of these databases, comprising:

a read-out step for reading out flight information stored in the respective databases provided in the plurality of information management devices;

a create step for creating a flight arrival information database storing flight arrival information from the flight information read out by said read-out means, a flight departure information database storing flight departure information from the flight information read out by said read-out step, wherein passenger information is extracted from a passenger information database using index keys from said flight arrival information database and said flight departure information database and stored in said flight arrival information database and said flight departure information database;

combining step for combining the flight arrival information with the flight departure information in a transfer information database, wherein flight arrival information having a passenger information index key matching a passenger information index key from the flight departure information is combined in the transfer information database; and a display control step for displaying, on display means, the flight arrival information and flight departure information stored in the transfer information database, in a format whereby combinations of flight arrival and flight departure relating to the same airplane can be seen using said passenger information index key.

9. A transfer information management method according to claim 8, wherein passenger information index key is a passenger name, and said combining means combines baggage information from a baggage information database with the transfer information database in accordance with the passenger information index key, the transfer information device further comprising:

a second display control step for displaying, on the display means, the passenger names from the transfer information database corresponding to the combination of flight arrival information and flight departure information selected in the first selecting step; and a third display control step for displaying, on the display means, baggage information from the transfer information database corresponding to the passenger names.

10. A transfer information management method according to claim 9, further comprising:

a flight departure information selecting step for selecting one flight departure information item from the flight arrival information and flight departure information displayed by the display control step, on the basis of input information; and an alternative flight information display control step for displaying in the form of alternative flight information on the display means, further flight departure information from the transfer information database having the same destination as the flight departure information selected in said flight departure information selecting step.

11. A transfer information management method according to claim 10, further comprising:

an alternative flight information selecting step for selecting one alternative flight information item from the alternative flight information displayed by the alternative flight information display control step, on the basis of input information; and an inquiry step for inquiring, with respect to the management device managing flight departures corresponding to the alternative flight information selected in said alternative flight information selecting step, whether a flight reservation is possible, and displaying the results of this inquiry on the display means.

12. A transfer information management method according to claim 11, wherein when a flight reservation is possible, said inquiry step makes a reservation using the passenger name selected in the second selecting step.

13. A transfer information management method according to claim 12, wherein when the flight reservation has been made, said inquiry step issues information for settlement of charges to the management device.

14. A transfer information management method according to claim 12, further comprising:

an instruction step for instructing a management device managing baggage transfer operations, of the plurality of management devices, to transfer baggage to an alternative flight where a reservation has been made, when a reservation has been made in said inquiry step.

* * * * *

UNITED STATES PATENT AND TRADEMARK OFFICE
CERTIFICATE OF CORRECTION

PATENT NO.: 6,003,009
DATED : December 14, 1999
INVENTOR(S): Takeshi NISHIMURA

It is certified that error appears in the above-identified patent and that said Letters Patent is hereby corrected as shown below:

On the Title Page:

[30] Foreign Application Priority Data -

Change "Sep. 11, 1995" to --Nov. 9, 1995--.

Signed and Sealed this

Fourth Day of July, 2000

Attest:

Q. TODD DICKINSON

*Attesting Officer*      *Director of Patents and Trademarks*